Aug. 15, 1967     H. L. REINSMA     3,336,087
RESILIENT SUSPENSION FOR TRACK TYPE TRACTORS
Filed Feb. 9, 1966     3 Sheets-Sheet 3

INVENTOR.
HAROLD L. REINSMA
BY
ATTORNEYS

United States Patent Office 3,336,087
Patented Aug. 15, 1967

3,336,087
RESILIENT SUSPENSION FOR TRACK TYPE TRACTORS
Harold L. Reinsma, Peoria, Ill., assignor to Caterpillar Tractor Co., Peoria, Ill., a corporation of California
Filed Feb. 9, 1966, Ser. No. 526,115
3 Claims. (Cl. 305—27)

ABSTRACT OF THE DISCLOSURE

Resilient suspension for track-type tractors utilizing compressible rubber-like material so arranged that the weight of the tractor places it under forces which at once compress it and tend to shear it.

---

In existing and proposed suspension systems utilizing rubber or similar material those which place the rubber under compression afford insufficient deflection and those which place it in shear permit excessive deflection.

It is an object of the present invention to provide a suspension system for track type tractors utilizing rubber-like material wherein the compression and shear characteristics of the rubber are both used.

A further object is to provide such a suspension in which each of the several track rollers of the tractor is individually resiliently suspended.

Further and more specific objects and advantages of the invention and the manner in which it is carried into practice are made apparent in the following specification by reference to the accompanying drawings.

Figure 1:
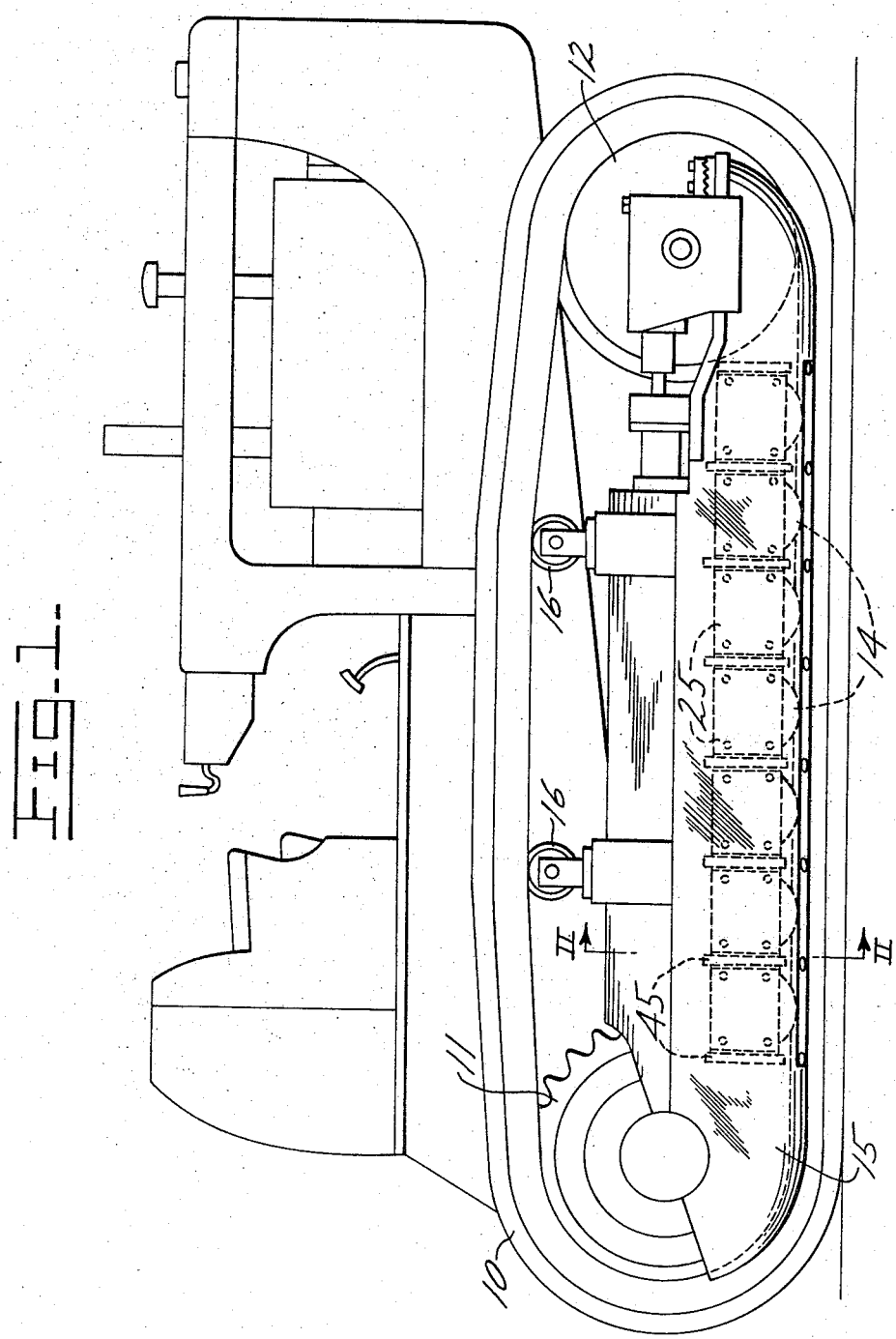
FIG. 1 is a view in side elevation of a track-type tractor illustrating generally the location of the suspension means of the present invention.
Figure 2:
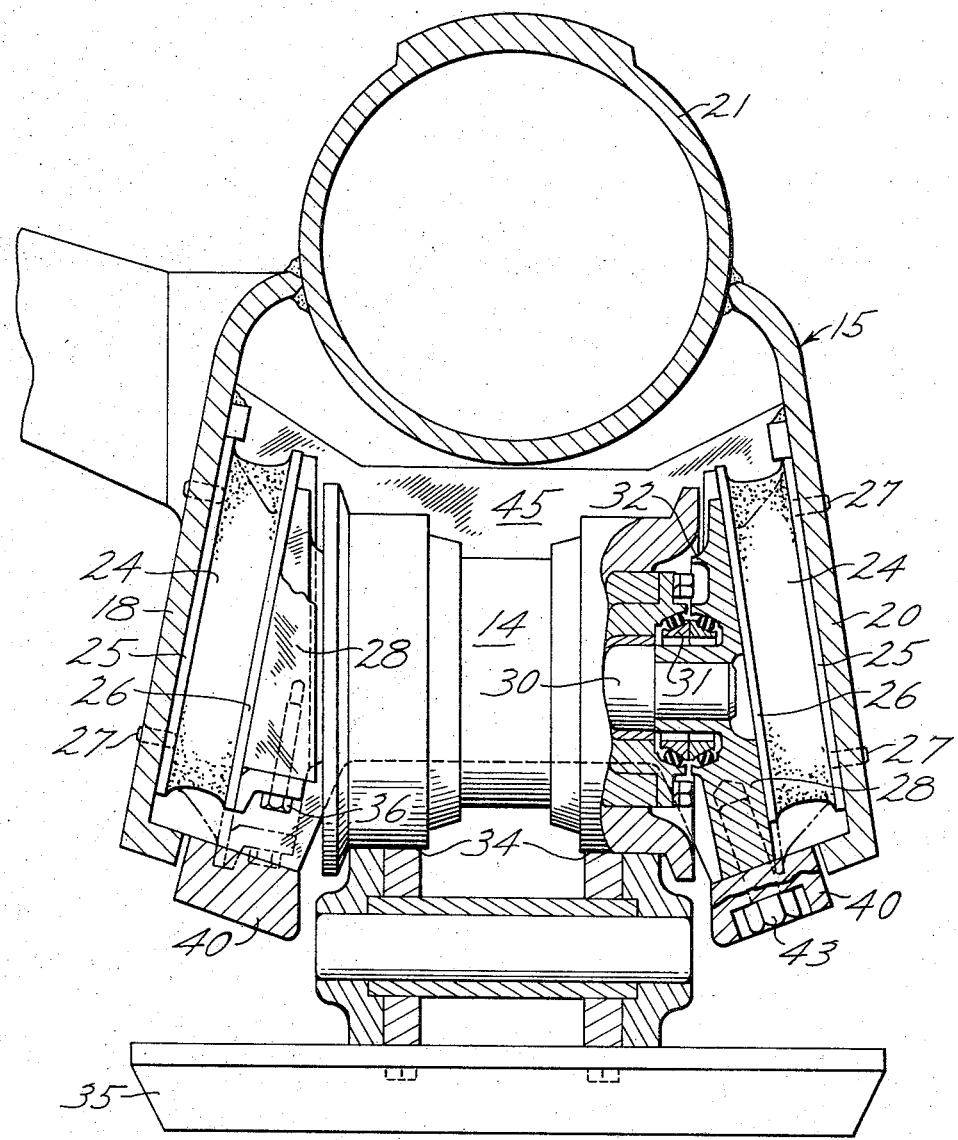
FIG. 2 is an enlarged section view taken on the line II—II of FIG. 1 and showing the construction of the suspension means.

A well known type of a track-type tractor is shown in FIG. 1 as having endless tracks, one of which is schematically shown at 10 trained over a driving sprocket 11 and an idler 12. A plurality of track rollers illustrated in dotted lines at 14 are supported by a track frame generally indicated at 15. The major portion of the weight of the tractor is supported by these track rollers which roll on the track surfaces provided by the endless track as the tractor moves forwardly over the ground. The upper flight of the track is supported by track support rollers such as illustrated at 16. The construction of the track roller frame which supports the resilient suspension means of the present invention and the track rollers is shown in FIG. 2. In this figure, the frame is shown as having two downwardly diverging side plates 18 and 20 connected at their upper ends by welding to a tubular beam 21. This beam provides a housing for track recoil mechanism (not shown) which is the mechanism which urges the idler 12 forwardly to maintain proper tension on the track.

Figure 3:
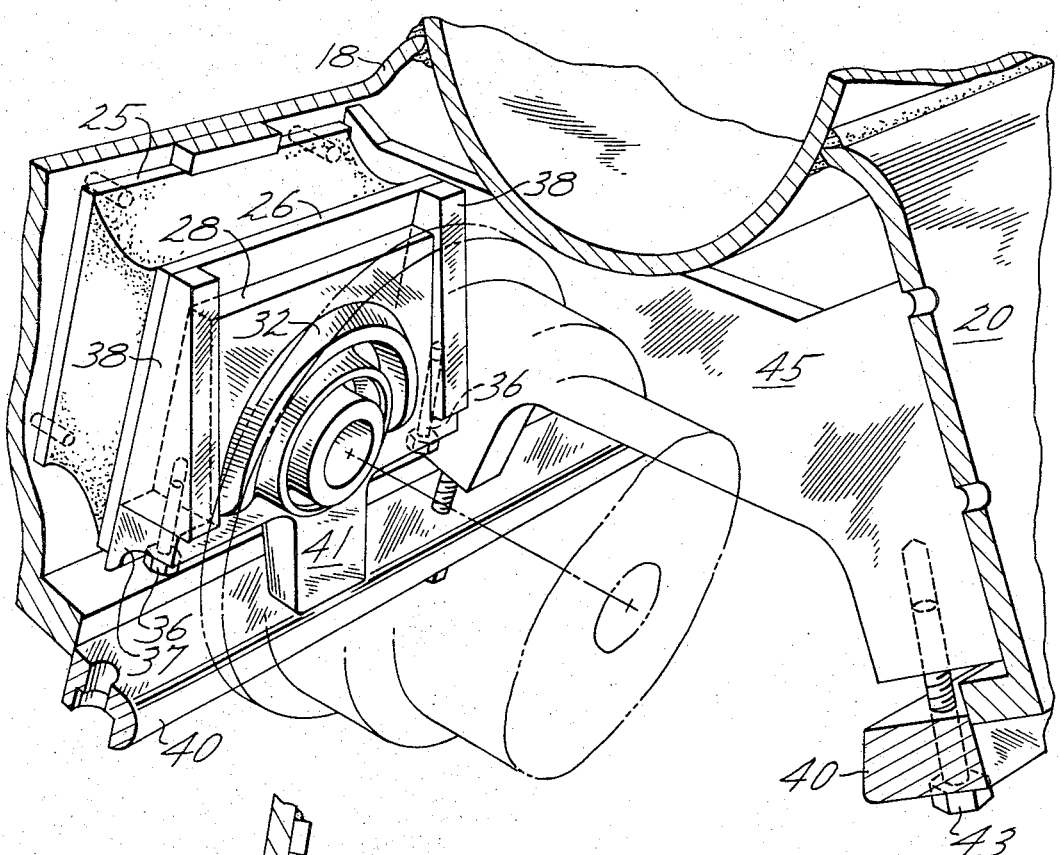
FIG. 3 is a fragmentary perspective view of one of the resilient suspension elements of the present invention illustrating means by which it is preloaded.

In FIG. 2, a track roller 14 is shown as supported between two resilient suspension members 24. Each suspension member is disposed between metal plates 25 and 26 to which it is bonded, the outer plates 25 being disposed against the frame members 18 and 20 and properly located thereon as by locating pins shown at 27. A wedge-shaped adapter block 28 is disposed between each of the plates 26 and an outer face of the track roller and these adapters not only receive the ends of the track roller shaft, one of which is shown at 30, but they cooperate with the end face of the hub of the track roller to provide suitable space for conventional seals such as shown at 31. They also have an arcuate web 32, best shown in FIG. 3, which projects into space at the end of the track roller to exclude relatively large pieces of dirt and rock which might enter during operation.

Figure 4:
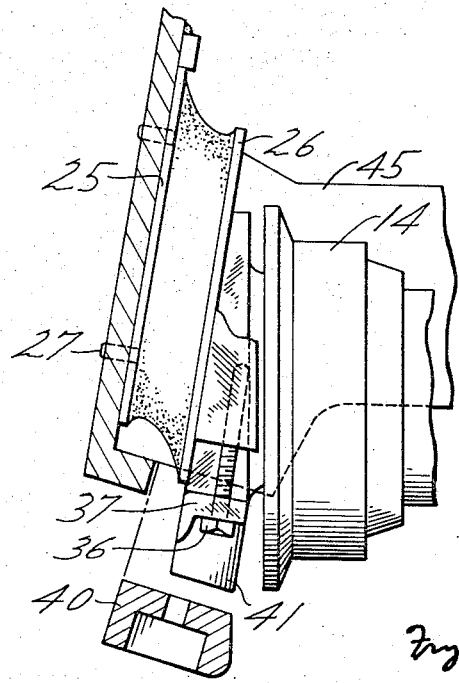
FIG. 4 is a fragmentary detail illustrating one of the same units in a position which it occupies before being preloaded.

Since the track roller is supported between the two downwardly diverging cushions 24 any shock received during its travel on the track surfaces which are shown at 34 in FIG. 2, a track shoe being shown at 35, tends to move the inner plates 26 of the resilient elements upwardly creating a shearing force within the rubber elements and since their upward movement brings them closer to the outer plates 25, a compressive force is also created. The spring rate of the resilient suspension elements 24 can be varied by preloading or precompressing them and in providing for this they are originally manufactured in the shape illustrated in FIG. 4 and also illustrated in broken lines in FIG. 2 with the inner plates 26 disposed considerably below the outer plates 25. This gives the whole cushion a downward bias or inclination while before use it will be compressed by upward movement of the inner plates 26 relative to the outer plates until it assumes the configuration illustrated in FIG. 2. To accomplish this compression, the wedge-shaped adapters 28 are secured with respect to the plates 26 by cap screws 36, best shown in FIGS. 3 and 4, as extending upwardly through ears 37 on the adapters 28 and threaded into holes in blocks 38 fixed to the inner surfaces of the plates 26. Thus the resilient suspension unit and the adapter are secured together and upward movement of the adapter will move the plate 26 upwardly to compress the rubber and place it in shear. Upward movement is accomplished through a pair of elongated bars 40 underlying the adapters and arranged to force the adapters upwardly by engagement with downwardly extending lugs 41 on the adapters. The bars 40 are drawn upwardly by cap screws 43 threaded into the lower edges of partition plates, one of which is shown at 45 in FIGS. 2 and 3, which extend transversely between the side frame members 18 and 20. Thus with all the cap screws 43 tightened, the resilient suspension elements are moved to the position of precompression illustrated by the full lines in FIG. 2.

As the track shoes engage the ground and transmit shock through the track rails and track rollers, a large part of the shock forces are absorbed by the suspension members upon upward movement of their plates 26 which introduces both compressive and shear forces into their cushioning elements.

The bar 40 has several important uses. It preloads the shear path suspension elements and absorbs the rebound forces. It is also useful as a track guard and not only prevents large rocks from entering the vicinity of the track chain, but provides a very rigid auxiliary track guide surface.

I claim:

1. Suspension means for a track-type tractor comprising a track frame at each side of the tractor including a pair of wall plates extending longitudinally of the tractor and diverging downwardly, track rollers disposed between the plates, and cushion means disposed between the plates and each end of each track roller whereby forces directed upwardly of the track rollers will tend to shear and compress the cushion means, the cushion means being a rubber-like material bonded between two metal plates, means for securing the plates between the track frame wall plates and both ends of the rollers, the last named means includes a wedge-shaped adapter fitting between each end of each track roller and one of said two metal plates and having means to receive the end of a track roller shaft.

2. Suspension means for a track-type tractor comprising a track frame at each side of the tractor including a pair of wall plates extending longitudinally of the tractor and diverging downwardly, track rollers disposed between the plates, and cushion means disposed between the plates and each end of each track roller whereby forces directed upwardly of the track rollers will tend to shear and compress the cushion means, each said cushion means a rubber-like element bonded between a plate which is secured to a wall plate and a plate which is secured relative to an end of the track roller, the rubber-like material being formed to cause the plates on the track roller side to extend downwardly with respect to the other plates, and means to force the downwardly extending plates up during assembly to place the cushion material under a preload of shear and compression.

3. The combination of claim 2 in which the last named means comprises a bar disposed on each side of the track chain in positions to serve as rock guards.

References Cited

UNITED STATES PATENTS

| | | | |
|---|---|---|---|
| 1,520,416 | 12/1924 | Holt | 305—27 |
| 1,571,628 | 2/1926 | Hendrickson | 305—27 |
| 2,272,270 | 2/1942 | Krotz | 267—63 |
| 2,393,369 | 1/1946 | Hait | 305—27 X |
| 2,396,558 | 3/1946 | Dean | 105—224.1 |
| 2,775,492 | 12/1956 | Wirkkala | 305—28 |

BENJAMIN HERSH, *Primary Examiner.*

RICHARD J. JOHNSON, *Assistant Examiner.*